United States Patent [19]

Roley

[11] 4,099,795
[45] Jul. 11, 1978

[54] TRACK-TYPE VEHICLE UNDERCARRIAGE

[75] Inventor: Robert D. Roley, Peoria, Ill.

[73] Assignee: Caterpillar Tractor Co., Peoria, Ill.

[21] Appl. No.: 814,234

[22] Filed: Jul. 8, 1977

[51] Int. Cl.² .................... B62D 55/10; B62D 55/30
[52] U.S. Cl. .................................................. 305/18
[58] Field of Search .................. 305/16, 17, 18, 24, 305/25

[56] References Cited

U.S. PATENT DOCUMENTS

| | | | |
|---|---|---|---|
| 1,660,101 | 2/1928 | Smyth | 305/18 X |
| 2,897,014 | 7/1959 | Darragh | 305/18 |
| 3,172,707 | 3/1965 | Tucker | 305/18 |

Primary Examiner—Robert B. Reeves
Assistant Examiner—John P. Shannon
Attorney, Agent, or Firm—James R. Bell

[57] ABSTRACT

A track-type vehicle undercarriage has a segmented track support rail including slidably interconnected segments in operable connection with a recoil member.

5 Claims, 4 Drawing Figures

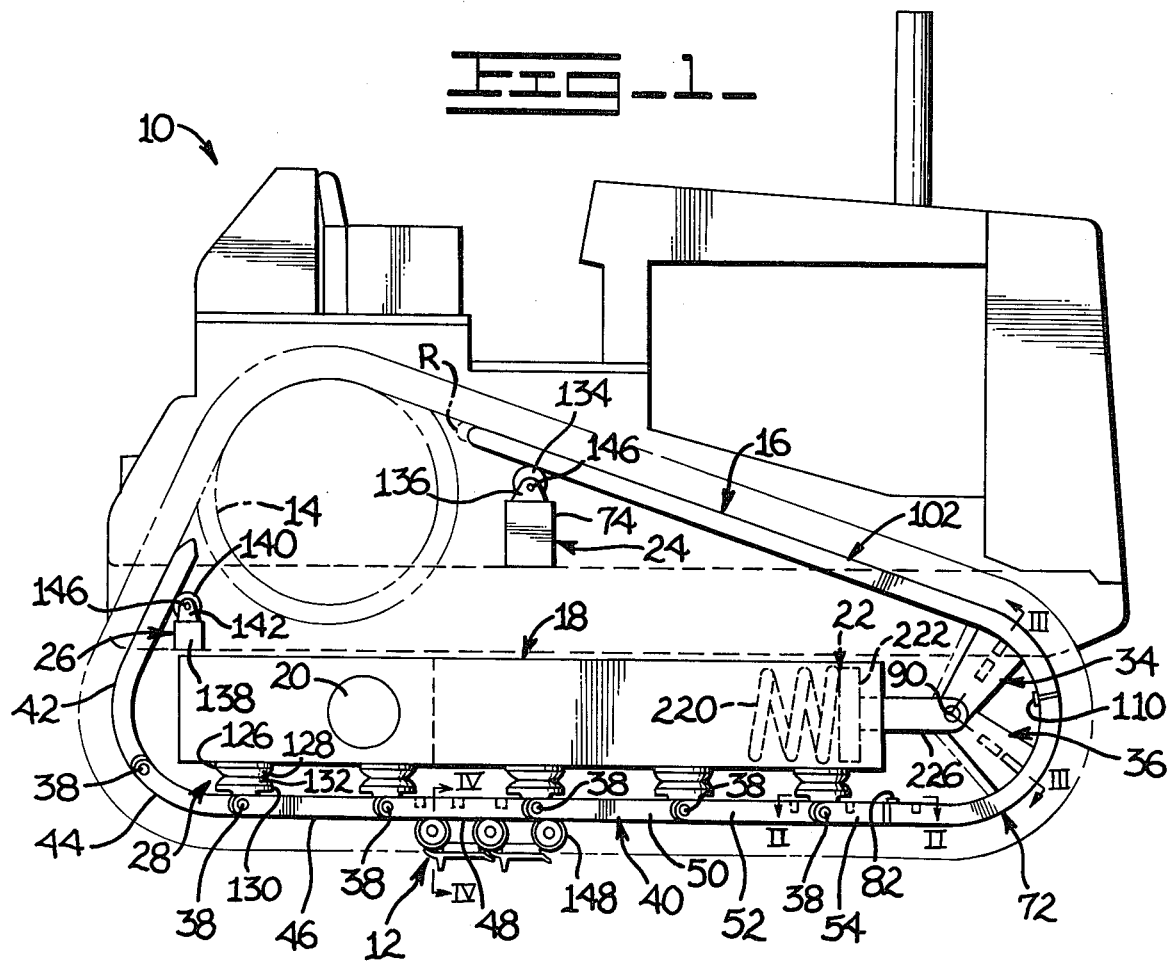
Fig-1-
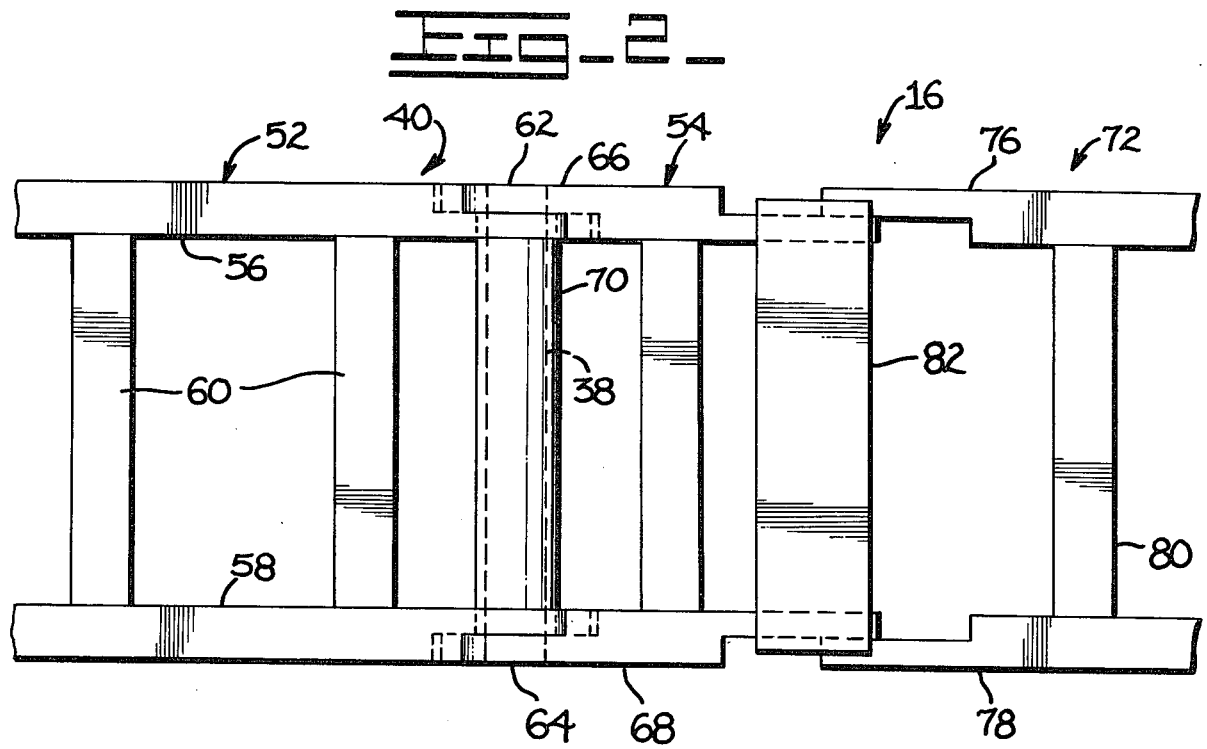
Fig-2-

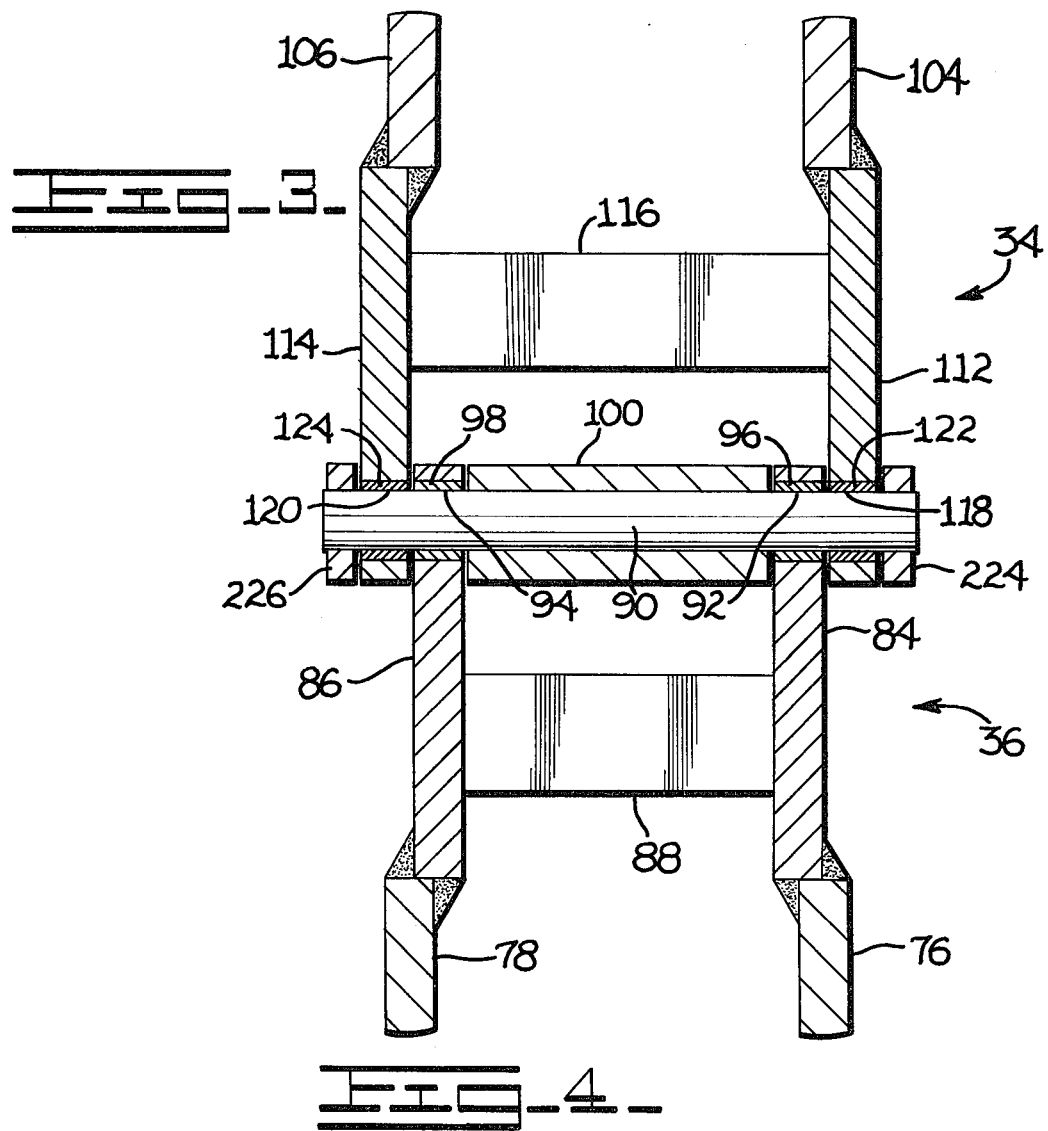
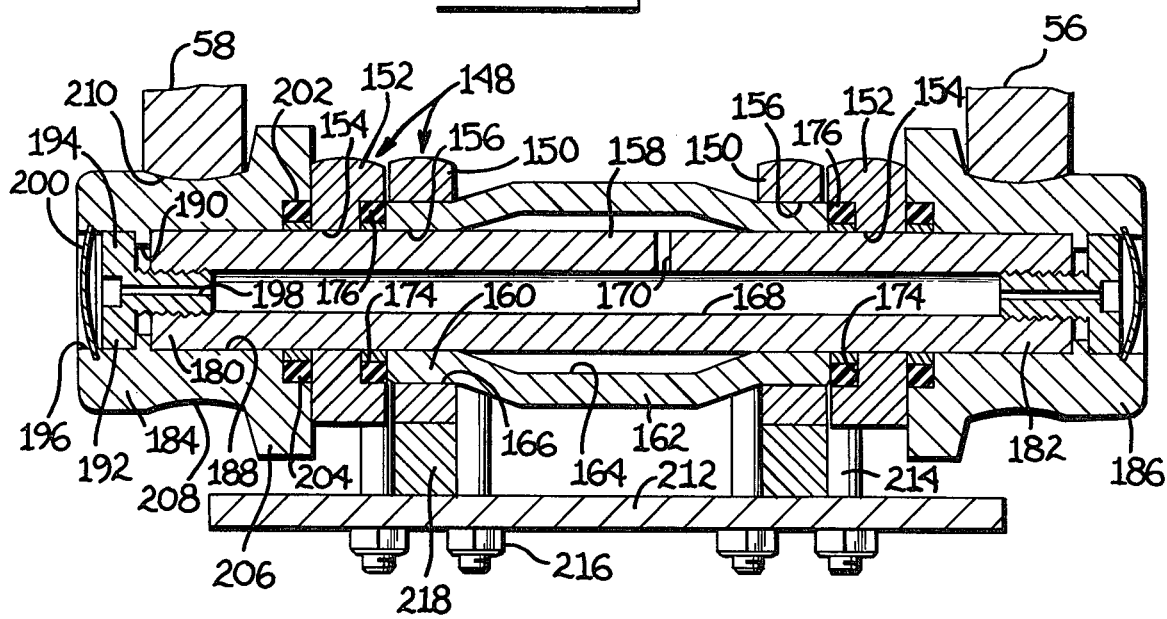

TRACK-TYPE VEHICLE UNDERCARRIAGE

BACKGROUND OF THE INVENTION

1. Field of the Invention

This invention relates generally to wheel substitutes for land vehicles and more particularly to those having plural link connector elements.

2. Description of the Prior Art

In the past, carrier rollers, track rollers and an idler have been used in combination for engaging, guiding and supporting the moving track of a vehicle having a track-type undercarriage. Also, a substantially continuous, supportive rail has been used to replace the rollers and idler as a means of guiding the moving track. An advantage of the continuous rail is the accompanying reduction in wear and noise usually associated with undercarriages. A disadvantage is that such rails are generally not very flexible or resilient for coping with track deflection or recoil.

In view of the above, it would be advantageous to provide a substantially continuous, supportive rail for guiding a moving track which is flexible and which overcomes the problems associated with the prior art.

SUMMARY OF THE INVENTION

The present invention is directed to overcoming one or more of the problems as set forth above.

According to the present invention this is accomplished by providing a track-type vehicle undercarriage having a segmented track support rail. The rail includes relatively slidably interconnected ones of the segments. A recoil member is connected to the slidably connected segments.

The foreqoing and other advantages will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is a side elevational view illustrating the track-type vehicle undercarriage of this invention;

FIG. 2 is a top view illustrating the support rail of this invention taken along the line II—II of FIG. 1;

FIG. 3 is a cross-sectional view illustrating the pivotal connection between the support rail and the recoil mechanism taken along the line III—III of FIG. 1; and FIG. 4 is a cross-sectional view illustrating the track link assembly used with the support rail of this invention.

DETAILED DESCRIPTION

Referring now to the drawings, a track-type vehicle generally designated 10 includes a track undercarriage 12 driven by a sprocket 14 and supported by a segmented support rail 16. The support rail 16 is supported by a rail frame 18 pivotally connected to the vehicle frame at well known pivot shaft 20 and includes a recoil member 22, also well known.

Support rail guides 24,26 are connected to the vehicle frame for engaging and maintaining rail 16 in position relative to track 12.

More specifically now, track support rail 16 is separated into three main portions. First segment or portion 40 includes a plurality of other segments pivotally interconnected at pins 38. Segment 42 is adjacent sprocket 14 and is pivotally connected to segment 44 at pin 38. Segments 42,44 are preferably appropriately curved to meet the desired track contour. Segment 46 pivotally connects to segment 44 and to segment 48 via pins 38. Segment 50 similarly interconnects with segments 48 and 52 via pins 38 and, completing the first portion, segment 54 pivotally interconnects with segment 52 via pin 38.

Each segment of rail 16 comprises a pair of spaced rails. For example, by referring to FIG. 2 it can be seen that segment 52 of support rail 16 comprises substantially parallel rails 56,58 spaced by spacer members 60 preferably welded to the rails. The rails 56,58 and the spacers 60 are preferably of a suitable steel. Also, it can be seen that segment 52 is pivotally connected to segment 54 by pin 38. As shown in the Figure, pin 38 is preferably a steel pin press fit at its opposite ends 62,64 into spaced rails 66,68 of segment 54 which overlap rails 56,58 of segment 52. Pin 38 and an accommodating preferably steel bushing 70 pass through overlapped spaced rails 56,58. In a similar manner, each segment of first portion 40 is pivotally interconnected.

A second segment portion 72 of support rail 16 includes an arcuate segment slidably interconnected with first portion 40. This is illustrated in FIGS. 1 and 2. Second portion 72 is curved to accommodate the desired contour of track 12 and comprises substantially parallel steel rails 76,78 interconnected by a spacer 80 preferably welded thereto as aforesaid.

The slidable interconnection between first portion 40 and second portion 72 is best illustrated at FIG. 2 wherein the spaced rails 76,78 of arcuate portion 72 partially overlap the spaced rails 66,68 of segment 54 of first portion 40 to permit some relative movement. A steel slide guide 82 is preferably welded to rails 66,68 and overlaps rails 76,78 to guide the spaced overlapping rails 76,78 in aligned sliding relationship with rails 66,68.

Second portion 72 is pivotally connected to recoil member 22 via bracket 36 as illustrated in FIG. 1. Bracket 36 is fixedly connected to second portion 72. FIG. 3 better illustrates bracket 36 in detail. Rails 76,78 of second portion 72 are preferably welded to bracket members 84,86 of bracket 36. The bracket members are preferably of a suitable steel and are spaced by a spacer 88 welded to the bracket members. A pin 90, preferably steel, passes through bores 92,94 in bracket members 84,86, respectively, to permit pin 90 to pivot relative to those bracket members. If preferred, bores 92,94 can be enlarged to accommodate bushings 96,98 to reduce frictional contact between relatively moving bracket 36 and pin 90. Also, if preferred, an additional spacer 100 can be mounted on pin 90 between bracket members 84,86.

A third segment or portion 102 of support rail 16 is slidably interconnected with second portion 72. This is illustrated in FIGS. 1 and 3. Third portion is formed to accommodate the desired contour of track 12 and comprises substantially parallel steel rails 104,106 interconnected by a spacer 108 preferably welded thereto as aforesaid.

The slidable interconnection between third portion 102 and second portion 72 is similar to the above-described slidable connection between first portion 40 and second portion 72, illustrated in FIG. 2. However, the slidable interconnection between third portion 102 and second portion 72 would provide the spaced rails 104,106 of third portion 102 partially overlapping the spaced rails 76,78 of second portion 72 to permit some relative movement. Also, a steel slide guide 110, FIG. 1, would preferably be used as aforesaid to guide the spaced overlapping rails in aligned sliding relationship.

Third portion 102 is pivotally connected to recoil member 22 via bracket 34 as illustrated in FIG. 1. Bracket 34 is fixedly connected to third portion 102. FIG. 3 better illustrates bracket 34 in detail. Rails 104,106 of third portion 102 are preferably welded to bracket members 112, 114 of bracket 34. The bracket members are preferably of a suitable steel, as in bracket 36, and are spaced by spacer 116 welded to bracket members 112,114. Pin 90, which is pivotally connected to bracket 36, passes through bores 118,120 in bracket members 112,114, respectively, to permit pin 90 to pivot relative to those bracket members. If preferred, bores 92,94 can be enlarged to accommodate bushings 112,124 to reduce frictional contact between relatively moving bracket 34 and pin 90.

A plurality of resilient suspension members, such as well known bogie pads designated 28, are preferably used to resiliently interconnect the first portion 40 of support rail 16 with the rail frame 18 of vehicle 10. The bogie pads 28 include pads of resilient material such as a suitable rubber-like material mounted on a steel base. For example, steel bases 126 are connected to frame 18 such as by welding or the like, the resilient pads 128 are mounted on bases 126. Also, opposed steel bases 130 are preferably pivotally mounted on first portion 40 such as by having a pivotal connection with pin 38. Opposed resilient pads 132 are mounted on bases 130. In this manner, pads 132 engage pads 128 to provide a resilient interconnection between first portion 40 and vehicle 10.

Support rail guides 24,26 are provided for maintaining rail 16 in position relative to track 12. In FIG. 1, one such guide 24 preferably comprises a steel brace 74 welded or otherwise fixedly attached to the frame of vehicle 10. A roller 134 is rotatably mounted on brace 74 via flange 136 and pin 146 for engaging third portion 102 of rail 16. Similarly, a preferred second guide 26 is fixedly attached to the frame of vehicle 10 including a brace 138 having a roller 140 rotatably mounted thereon via flange 142 and pin 144 for engaging segment 42 of first rail portion 40.

Recoil member 22, see FIGS. 1 and 3, includes a substantial compression coil spring 220, well known, compressed due to movement of an adjacent plunger 222. Plunger 222 preferably includes spaced steel recoil brackets 224,226 extending therefrom for press fit connection to rail brackets 34,36 at pin 90, see FIG. 3.

Track 12, partially shown in FIG. 1, includes a plurality of individual track links, generally designated 148, which may be of generally conventional construction. In FIG. 4, spaced rails 56,58 of first portion 40 engage roller bushings 184 and 186. As is well known, each link 148 is formed of spaced apart elements arranged in generally parallel fashion and having offsets therein so that relatively narrow ends 150 of one link are interposed between relatively wide ends 152 of the next adjacent link in serial fashion. The ends 152 include bores 154, while the ends 150 include bores 156 which are aligned with the bores 154. Track pins 158 extend through the bores to pivotally interconnect adjacent ones of the links.

According to the present invention, the bores 156 have a larger diameter than the bores 154 and rotatably receive the reduced diameter ends 160 of a central bushing 162. The interior surface 164 of the central portion of the central bushing 162 is spaced from the exterior of the pin 158 while the interior surfaces 166 of the end portions 160 of the central bushing 162 are in abutment with the exterior of the pin 158.

The pin 158 is provided with a through bore 168 and at some location adjacent the center of the pin 158, there is provided an axially extending bore 170 which provides fluid communication between the bore 168 and the expanded interior of the central bushing 162. The expanded interior of the central bushing 162 and the through bore 168 provide a lubricant reservoir for receipt of lubricant such as oil or grease.

The axially inner faces of the link ends 152 are provided with annular recesses 174 concentric about the bores 154 for receipt of seals 176 which seal against the ends of the central bushing 162 to prevent lubricant from escaping at the interface between the wide ends 152 and the narrow ends 150 of adjacent links.

It is to be observed that the opposite ends 180 and 182 of each of the pins 158 extend substantially beyond the axially outer faces of the wide ends 152 of the links 148 to rotatably mount roller bushings 184 and 186, respectively. The roller bushings 184 and 186 are identical as are related components and, accordingly, only the roller bushing 184 will be described in detail.

The axially inner end of the roller bushing 184 is provided with an axially extending bore 188 which terminates in a radially inwardly directed annular shoulder 190. The bore 188 is sized to mount the roller bushing 184 on the end of the pin 158. A bolt 192 having an enlarged head 194 is threaded into mating threads in the end 180 of the pin 158. The enlarged head 194 of the bolt 192 is received in a cavity 196 in the axially outer end of the roller bushing 184 and is abutted against the shoulder 190 sufficiently to retain the roller bushing 184 in place with minimum axial play and yet allow substantially free rotation thereof.

The bolt 192 includes an axially extending bore 198 which establishes fluid communication from the head 194 of the bolt 192 to the interior of the pin 158. Lubricant may be introduced into the reservoir identified previously through the passage 198. In order to preclude loss of lubricant from the reservoir through the passage 198, snap caps 200 are disposed in the cavities 196 on the axially outer side of the bolt heads 194.

The axially inner face of each of the roller bushings 184 is provided with an annular groove 202 concentric with the bore 188 for receipt of a seal 204 which sealingly engages the axially outer face of the adjacent wide end 152. Consequently, it will be appreciated that the entire assemblage is sealed and yet lubricated.

The axially inner end of each of the roller bushings 184 is provided with a peripheral, radially outwardly-extending flange 206 which is located axially inwardly of the corresponding rail 58. Immediately adjacent each flange 206 is an annular, peripheral recess 208 which is concave in cross section and formed to substantially mate with a convex surface 210 of the associated rail 58 in line contact therewith.

Each of the links 148 mounts track shoes 212 which may be of conventional construction. The U-bolts 214 extend through aligned bores (not shown) in associated ones of the track shoes 212 to receive nuts 216. Spacers 218 are interposed between the undersides of the narrow ends 150 and the upper sides of the track shoes 212 to space the same sufficiently as to avoid interfering contact with the flanges 206 on the roller bushings 184.

In operation, it can be seen from the foregoing that this invention provides a substantially continuous, supportive rail 16 for guiding track 12. Rail 16 is segmented and comprises portions 40, 72 and 102. Portion 40 includes a plurality of segments pivotally interconnected at pins 38.

When track deflection occurs, the pivotally interconnected segments of portion 40 can absorb track deflection through resilient bogie pads 28. Recoil of the track is absorbed due to the relative sliding motion between portions 40, 72 and 102 of rail 16. Additionally, recoil is absorbed due to compression of coil springs 220 by plunger 222 due to connection of that plunger to rail portions 72, 102 via rail brackets 36, 34, respectively, connected to recoil brackets 224, 226 at pin 90.

Rail guides 24, 26 maintain rail 16 in position with respect to track 12 and especially guide 24 which guides rail portion 102 to its recoil position designated R.

The foregoing has described a substantially continuous, supportive rail for guiding a moving track which can absorb track deflection and track recoil.

The embodiments of the invention in which an exclusive property or privilege is claimed are defined as follows:

1. A track-type vehicle undercarriage, comprising:
a segmented track support rail;
a recoil member operably connected to the rail;
a first portion of the support rail including a plurality of pivotally interconnected segments;
a second portion of the support rail including an arcuate segment slidably interconnected with the first portion and pivotally connected to the recoil member; and
a third portion of the support rail slidably interconnected with the second portion and pivotally connected to the recoil member.

2. The undercarriage of claim 1, comprising:
suspension members connected to the first portion of the support rail.

3. The undercarriage of claim 1, comprising:
suspension members connected to the first portion at the pivotal interconnections.

4. The undercarriage of claim 1, comprising:
at least one support rail guide means connected for maintaining the rail in position relative to the associated vehicle.

5. A track-type vehicle undercarriage, comprising:
a segmented track support rail;
a recoil member operably connected to the rail;
a first portion of the support rail including a plurality of pivotally interconnected segments;
a second portion of the support rail including an arcuate segment slidably interconnected with the first portion;
a third portion of the support rail interconnected with the second portion;
a bracket fixedly connected to the second portion and pivotally connected to the recoil member; and
another bracket fixedly connected to the third portion and pivotally connected to the recoil member.

* * * * *

UNITED STATES PATENT AND TRADEMARK OFFICE
CERTIFICATE OF CORRECTION

PATENT NO. : 4,099,795
DATED : July 11, 1978
INVENTOR(S) : Robert D. Roley

It is certified that error appears in the above-identified patent and that said Letters Patent are hereby corrected as shown below:

Col. 6, line 26 -- after "rail" and before "interconnected", insert -- slidably --.

Signed and Sealed this

Sixth Day of March 1979

[SEAL]

Attest:

RUTH C. MASON
Attesting Officer

DONALD W. BANNER
Commissioner of Patents and Trademarks